(12) United States Patent
Mackintosh et al.

(10) Patent No.: US 7,879,503 B2
(45) Date of Patent: Feb. 1, 2011

(54) FUEL CELL STACK INCLUDING BYPASS

(75) Inventors: Charles Mackintosh, Victor, NY (US); Seth Valentine, Oklahoma City, OK (US); Sitima R. Fowler, Fairport, NY (US); Steven L. Piedmont, Macedon, NY (US)

(73) Assignee: Gm Global Technology Operations LLC, Detroit, MI (US)

( * ) Notice: Subject to any disclaimer, the term of this patent is extended or adjusted under 35 U.S.C. 154(b) by 1566 days.

(21) Appl. No.: 11/207,513

(22) Filed: Aug. 19, 2005

(65) Prior Publication Data

US 2007/0042258 A1 Feb. 22, 2007

(51) Int. Cl.
*H01M 2/38* (2006.01)
*H01M 2/40* (2006.01)
*H01M 8/24* (2006.01)
*H01M 8/04* (2006.01)
*H01M 8/06* (2006.01)

(52) U.S. Cl. .................. 429/456; 429/512; 429/414
(58) Field of Classification Search ............... 429/12, 429/38, 39, 413, 414, 512, 456
See application file for complete search history.

(56) References Cited

U.S. PATENT DOCUMENTS

| | | | |
|---|---|---|---|
| 6,214,490 B1 * | 4/2001 | Pate ........................ | 429/94 |
| 6,391,485 B1 * | 5/2002 | Perry ....................... | 429/13 |
| 2002/0146603 A1 * | 10/2002 | Nguyen ..................... | 429/13 |
| 2003/0091880 A1 * | 5/2003 | Joos et al. .................. | 429/21 |
| 2003/0099873 A1 * | 5/2003 | Brambilla et al. ........... | 429/32 |
| 2003/0219644 A1 * | 11/2003 | Inai et al. .................. | 429/38 |
| 2003/0235723 A1 * | 12/2003 | Simpkins et al. ............ | 429/13 |

* cited by examiner

*Primary Examiner* — Helen O Conley
(74) *Attorney, Agent, or Firm* — John A. Miller; Miller IP Group, PLC

(57) ABSTRACT

A fuel cell stack including a bypass is provided. The fuel cell stack includes a plurality of electricity generating cells in the known manner. A bypass is included for reducing the water entering the electricity generating cells of the fuel cell stack. The bypass may comprise at least one bypass cell disposed adjacent the first electricity generating cell in the stack. The bypass cell comprises a pair of separator plates defining an anode side and a cathode side. The bypass cell includes a conductive spacer comprising gas diffusion media disposed between the pair of separator plates. The bypass cell preferably blocks the cathode port on the separator plate. In this manner, the cell is inactive and does not produce electricity. The anode port of the cell remains open and an anode feed flows through the bypass to reduce water provided to the first electricity-generating cell. Alternatively or additionally, the cathode port remains open. Further the bypass may be placed before the cell stack itself.

20 Claims, 5 Drawing Sheets

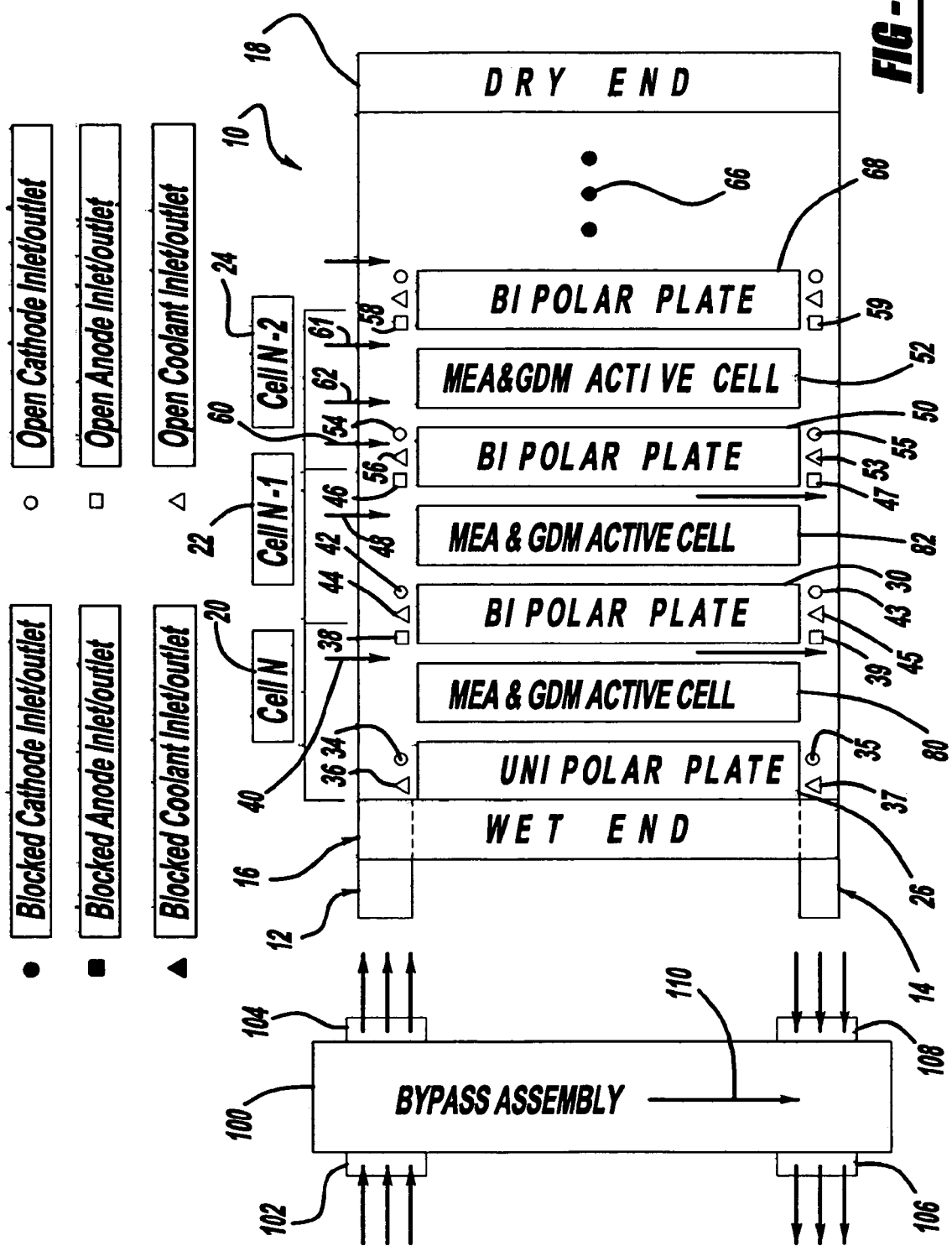

FUEL CELL STACK INCLUDING BYPASS

FIELD OF THE INVENTION

The present invention relates to a fuel cell stack that generates electricity to power vehicles or other machinery. More particularly, the present invention relates to a fuel cell stack that includes a bypass to reduce fuel cell flooding.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

Fuel cells generally include three components: a cathode, an anode and an electrolyte which is sandwiched between the cathode and the anode and passes only protons. Each electrode is coated on one side by a catalyst. In operation, the catalyst on the anode splits hydrogen into electrons and protons. The electrons are distributed as electric current from the anode, through a drive motor and then to the cathode, whereas the protons migrate from the anode, through the electrolyte to the cathode. The catalyst on the cathode combines the protons with electrons returning from the drive motor and oxygen from the air to form water. Individual fuel cells can be stacked together in series electrically to generate increasingly larger quantities of electricity.

In a Polymer-Electrolyte-Membrane (PEM) fuel cell, a polymer electrode membrane serves as the electrolyte between a cathode and an anode. The polymer electrode membrane currently being used in fuel cell applications requires a certain level of humidity to facilitate proton conductivity. Therefore, maintaining the proper level of humidity in the membrane, through humidity/water management, is desirable for the proper functioning of the fuel cell. Irreversible damage to the fuel cell may occur if the membrane dries out.

In order to prevent leakage of the hydrogen fuel gas and oxygen gas supplied to the electrodes and prevent mixing of the gases, a gas-sealing material and gaskets are arranged on the periphery of the electrodes, with the polymer electrolyte membrane sandwiched there between. The sealing material and gaskets are assembled into a single part together with the electrodes and polymer electrolyte membrane to form a membrane and electrode assembly or membrane electrode assembly (MEA). Disposed outside of the MEA are conductive separator plates (unipolar or bipolar plates) for mechanically securing the MEA and electrically connecting adjacent MEAs in series. A portion of the separator plate, which is disposed in contact with the MEA, is provided with a gas passage for supplying hydrogen or oxygen fuel gas to the electrode surface and removing generated water vapor.

Multi-cell PEM fuel cells comprise a plurality of the MEAs stacked together in electrical series and separated one from the next by a gas-impermeable, electrically-conductive separator plate or a bipolar plate. Such multi-cell fuel cells are known as fuel cell stacks. The bipolar plate has two working faces, one confronting the anode of one cell and the other confronting the cathode on the next adjacent cell in the stack, and electrically conducts current between the adjacent cells. Current collectors at the ends of the stack contact the end cells. The separator plate contains a flow field that distributes the gaseous reactants (e.g. $H_2$ and $O_2$/air) over the surfaces of the anode and the cathode. These flow fields generally include a plurality of lands which define a plurality of flow channels through which the gaseous reactants flow between a supply header and an exhaust header located at opposite ends of the flow channels.

The fuel cell stack is usually held together in its assembled state by side plates and end plates. Fuel and air inlet manifolds are connected to a stack inlet port. The stack inlet port directs fuel and air to its respective manifold that distributes the fuel and air to the surfaces of the anode and cathode respectively. Additionally, the stack typically includes a manifold connected to the inlet port for directing coolant to interior channels within the cells of the stack to absorb the heat generated in the cells. The stack also includes an outlet port connected to outlet manifolds for exhausting unreacted fuel and air, each of which carries entrained water, as well as an outlet manifold for the coolant liquid exiting the stack.

A highly porous (i.e. ca. 60%-80%), electrically-conductive material (e.g. cloth, screen, paper, foam, etc.) known as "diffusion media" or gas diffusion media (GDM) is interposed between the current collectors and the MEA and serves (1) to distribute gaseous reactant over the entire face of the electrode, between and under the lands of the current collector, and (2) collects current from the face of the electrode confronting a groove, and conveys it to the adjacent lands that define that groove.

Because the proton conductivity of PEM fuel cell membranes deteriorates rapidly as the membranes dry out, external humidification is required to maintain hydration of the membranes and sustain proper fuel cell functioning. Often, water is added to the anode feed stream. Moreover, the presence of liquid water in automotive fuel cells is unavoidable because appreciable quantities of water are generated as a by-product of the electrochemical reactions during fuel cell operation. Furthermore, saturation of the fuel cell membranes with water can result from rapid changes in temperature, relative humidity, and operating and shutdown conditions. Excessive membrane hydration may result in flooding, excessive swelling of the membranes, degradation of cell performance, and the formation of differential pressure gradients across the fuel cell stack.

Because the balance of water in a fuel cell is important to operation of the fuel cell, water management has a major impact on the performance and durability of fuel cells. Fuel cell degradation can occur with excessive water. Long-term exposure of the membrane to water can also cause irreversible material degradation. Cells closest to the inlets and outlets are particularly susceptible to degradation due to excessive water. More specifically, when water enters the fuel cell stack through the reactant inlets, more water tends to enter the cells closest to the stack inlet causing a relatively lower and unstable voltage in those cells. It is, therefore, desirable to provide a fuel cell stack that reduces the effect on cell performance of water entering the fuel cell stack.

SUMMARY OF THE INVENTION

According to one embodiment of the present invention, there is provided a fuel cell stack comprising a plurality of cells for generating electricity arranged in series from a wet end to a dry end. Each of the cells comprises at least two separator plates defining an anode side and a cathode side and including gas diffusion media and a membrane electrode assembly between the separator plates. Each of the cells further comprising an anode inlet on one of the separator plates for directing an anode feed stream to the anode side of said cell and a cathode inlet on the other of the separator plates for directing a cathode feed stream to the cathode side of said cell. The anode inlet is in fluid communication with an anode inlet manifold and the cathode inlet is in fluid communication with a cathode inlet manifold. The stack further comprises a bypass adjacent the wet end adapted to reduce the amount of water entering the electricity generating cells.

According to another embodiment of the present invention, there is provided fuel stack comprising a plurality of cells arranged in series from a wet end to a dry end. Each of said cells comprises at least two separator plates defining an anode side and a cathode side and having an element between the separator plates. Each of the cells further comprises an anode inlet on one of the separator plates for directing an anode feed stream to the anode side of the cell and a cathode inlet on the other of the separator plates for directing a cathode feed stream to the cathode side of said cell. An anode inlet manifold is in fluid communication with the anode inlet on one of the separator plates for distributing the anode feed stream to the anode inlet. A cathode inlet manifold is in fluid communication with the cathode inlet on the other of the separator plates for distributing the cathode feed stream to the cathode inlet. The cathode inlet of at least the first of the cells in the plurality of cells adjacent the wet end is blocked to prevent the cathode feed stream from being directed to the cathode side of the cell.

A method of reducing the amount of water entering electricity generating cells of a fuel cell stack is also provided. The method comprises providing a plurality of cells for generating electricity arranged in series from a wet end to a dry end. Each of the cells comprises at least two separator plates defining an anode side and a cathode side and including gas diffusion media and a membrane electrode assembly between the separator plates. Each of the electricity generating cells further comprises an anode inlet on one of the separator plates for directing an anode feed stream to the anode side of the cell and a cathode inlet on the other of the separator plates for directing a cathode feed stream to the cathode side of the cell. The anode inlet is in fluid communication with an anode inlet manifold and the cathode inlet is in fluid communication with a cathode inlet manifold. The method further comprises providing a bypass adjacent the electricity generating cell at the wet end by providing at least one inoperative cell adjacent the electricity generating cell at the wet end.

BRIEF DESCRIPTION OF THE DRAWINGS

Advantages of the present invention will be more fully appreciated from the detailed description when considered in connection with accompanying drawings of presently preferred embodiments which are given by way of illustration only and are not limiting wherein:

FIG. 5 is a schematic view of a fuel cell stack in accordance with another embodiment of the present invention.

DETAILED DESCRIPTION OF THE INVENTION

The present invention generally relates to a fuel cell stack that includes a bypass to reduce flooding.

Figure 1:
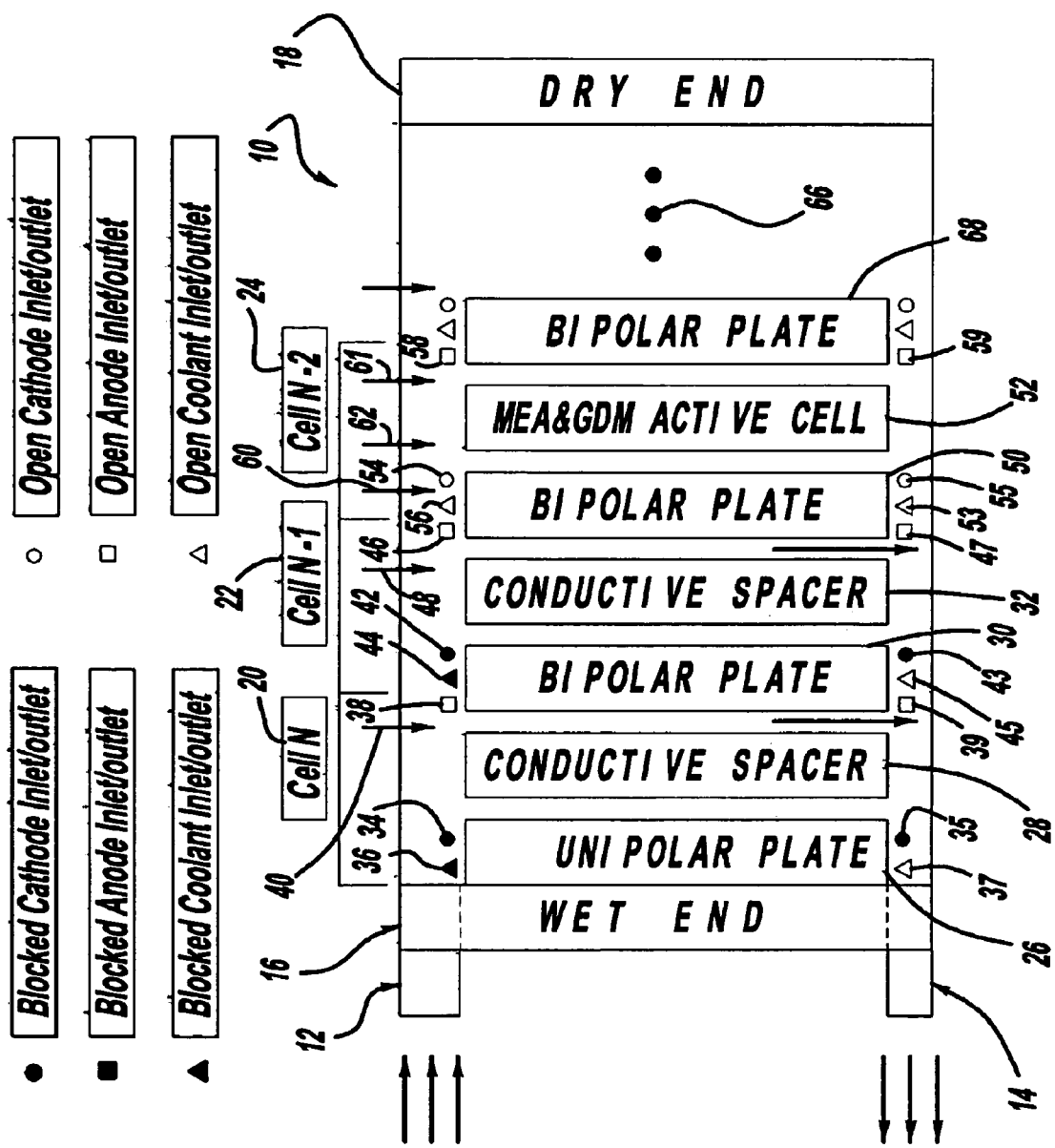
FIG. 1 is a schematic view of a fuel cell stack.

The fuel cell stack assembly is generally shown schematically at 10 in FIG. 1. The fuel cell stack includes a stack inlet, schematically indicated at 12. The stack inlet 12 has separate connection to three separate manifolds. The manifolds are shown schematically in areas of FIG. 1 above the element of the cells that show the feed streams as discussed below. One manifold distributes inlet or feed fuel, typically hydrogen, to the anode. One manifold distributes inlet or feed air to the cathode and one manifold distributes inlet or feed coolant to the conductive separator plates.

During operation of the fuel cell stack 10, hydrogen gas flows to the anode side of the individual cells. In like manner, oxygen flows to the cathode side of the individual cells. At the anode, the hydrogen is split in to electrons and protons. The electrons are passed-through the plate to the neighboring cathode. In the end cell in the stack (cell 1, as discussed below) the electrons are distributed as electrical current from the anode, through a drive motor (not shown) and then to the cathode at the opposite end cell in the stack, cell N. The protons migrate from the anode, through the PEM to the cathode. At the cathode side, the protons are combined with electrons and oxygen to form water vapor. The water vapor and condensed water droplets diffuse from the cathode through the gas diffusion media, into the flow field channels of the bipolar plate and are discharged from the fuel cell stack. The water, and unreacted air exit through their respective manifold shown schematically below the components of the cells in FIG. 1 and through the stack outlet schematically indicated at 14 in FIG. 1. Similarly, unreacted fuel, hydrogen gas, exits the anode to a suitable outlet manifold shown schematically below the components of the cells in FIG. 1 and through the stack outlet 14.

Thus, as it is well known that in a fuel, cell stack at the cathode side, the fuel cell generates water in the catalyst layer. The water must leave the electrode. Typically, the water leaves the electrode through the many channels of the bipolar plate or unipolar plate. Typically, air passes through the channels and pushes the water through the channels. A problem that may arise is that the water creates a slug in the channels and air cannot get to the electrodes. When this occurs, the catalyst layer near the water slug may not work. When a water slug forms, the catalyst layer near the slug becomes ineffective. This condition is sometimes referred to as flooding of the fuel cell. The result of flooding is a voltage drop that creates a low voltage cell in the stack.

A similar phenomenon holds true on the anode side of the cell. On the anode side of the cell, water enters the cell stack with the hydrogen gas fuel. The hydrogen fuel may not push the water through the channels of the element or bipolar plate creating a flooding condition within the cell.

In operation, flooding of the cell may occur if the volume of water entering the cell stack with the feed anode gas (hydrogen) is too high. This can occur when, for example, the water entering is in liquid form because the cell stack is not operating at optimal parameters, such as during start up. That is, the fuel cell stack 10 optimally operates at temperatures above ambient. At start up, the temperatures are lower than optimal. The water entering with the anode gas will typically contain more liquid water during this phase than water vapor. This liquid may result in excess liquid water in the cell causing performance degradation. Similarly, if the inlet manifold is at a lower temperature than optimum, water vapor entrained in the anode feed stream may condense, causing an excess of liquid water in the cell.

Similarly, water exiting the cathode may also cause a flooding condition in the cell. If the water backs up at the cathode outlet, it may cause excess liquid water in the cells causing cell performance degradation.

Often times, when a voltage drop occurs due to flooding, the voltage drop continues to worsen. When one of the channels in the plate becomes clogged the oxygen or hydrogen flow rate passing through the other channels in other cells within the same stack increases Eventually, the cell with insufficient gas flow to force water out through its channels saturates with water and may fail. Since the stack is in series electrically, eventually the whole fuel cell stack may fail. Accordingly, it is desirable to minimize the effect of water entering or exiting the fuel cell stack on voltage producing cells to increase the fuel cell reliability.

A preferred fuel cell stack is shown schematically in FIG. 1. As shown in FIG. 1, the fuel cell stack 10 is generally configured to have a wet end, generally indicated at 16, and a dry end, generally indicated at 18. The wet end 16 is denoted wet end because the inlets 12 and outlets 14 of the stack are located at this end. The cells at the wet end of the stack typically contain more liquid water than those at the dry end. The wet end 16 of the fuel cell stack 10 includes the fuel cell stack inlet 12 and outlet 14. The wet end typically contains more water because of the water that is entrained in the anode inlet or feed gases enter the wet end. Similarly, the cathode stream, including the reacted water, exits the stack outlet 14 at the wet end 16.

As shown in FIG. 1, the cell adjacent to the wet end is denoted as cell N and is given reference numeral 20. The cell N, 20, is the first cell in the stack 10 closest to the wet end 16. The next cell adjacent to cell N, 20, is denoted as cell N-1 and is given reference numeral 22. Similarly, the next adjacent cell to cell N-1, 22, is denoted N-2 and is given reference numeral 24. This particular nomenclature is used because it is common to denote the first cell adjacent the dry end 18 as cell number 1. Then, any number of cells may be included from the dry end 18 to the wet end 16. It will be appreciated that any number of cells can be used in the stack. Accordingly, the last cell in the stack, at the wet ends is generally denoted cell N. Here, it will be appreciated that each of the cells after N-2, 24, has been omitted from the drawings. It will be appreciated that any number of cells may be used.

At each end of the stack 10, a unipolar plate is used. As shown, unipolar plate 26 is in cell N, 20, adjacent the wet end 16 of the cell stack 10. The unipolar plate at the dry end of the stack 10 is not shown. It is pointed out that each bracket located below the cell designation schematically shows the beginning and ending of each respective cell. The unipolar plate 26 in ordinary operative cell is disposed adjacent an MEA (Membrane Electrode Assembly) and GDM (Gas Diffusion Media) such as is set forth in connection with cell N-2, 24. In the preferred embodiment, however, as shown in FIG. 1, the MEA of cell N, 20, is replaced with an element that comprises an electrically conductive spacer 28. The conductive spacer preferably comprises the GDM, but eliminates the MEA. Cell N, 20, is therefore, an inactive cell and is used to provide a bypass for water entering the wet end 16 of the cell stack 10 with the anode inlet gas. Cell N, 20, does not generate electricity. One side of bipolar plate 30 provides the end of cell N, 20.

The next cell, cell N-1, 22, in the stack 10 is preferably an inactive cell. Cell N-1, 22, commences on one side of a bipolar plate 30. A second conductive spacer 32 in cell N-2, 24, is adjacent the bipolar plate 30. One side of bipolar plate 50 provides the end of cell N-2, 24.

Cells N, 20, and N-1, 22, are inactive cells that do not include an MEA. Accordingly, the cells do not operate to produce electricity. These cells provide a bypass for water entering with the anode stream. More particularly, the unipolar plate 26 of cell N, 20, includes both a cathode inlet schematically shown at 34 and a coolant inlet schematically shown at 36. These inlets are connected to their respective inlet manifolds. Also shown are cathode outlet 35 and coolant outlet 37. The respective inlets and outlets together define a port. For example, cathode inlet 34 and cathode outlet 35 define the cathode port for the cell. In each case, the cathode inlet 34 and coolant inlet 36 are blocked to thereby block the respective cathode and coolant port. That is, no coolant feed or cathode feed can pass into the cell N, 20. Thus, the cathode feed stream in the cathode inlet manifold is blocked from entering the unipolar plate 26 by blocking the cathode inlet 34. Additionally, the coolant inlet 36 is blocked such that the coolant feed stream entering the coolant manifold likewise cannot flow over the unipolar plate 26. Further, it is preferable that the cathode outlet 35 also be blocked to prevent any unreacted cathode feed or reaction product from back-feeding into cell N, 20 and mixing in this bypass cell. The coolant outlet 37 preferably remains open. It will be appreciated that the coolant outlet 32 can be blocked if desired.

The anode inlet 38 for cell N, 20, is formed on one side of the bipolar plate 30. The anode port is open. Accordingly, the anode inlet 38 and outlet 39 are open. Anode gases entering the stack inlet 12 pass through the anode inlet manifold into the open anode inlet 38 and pass through the flow fields on the anode side of the bipolar plate 30. The anode inlet on the bipolar plate 30 is represented by reference numeral 38. The anode inlet or feed stream 40 is thus transferred from the anode inlet manifold through the open anode inlet 38 on the bipolar plate 30. It has been found that a significant portion of the entrained water in the anode feed stream 40 will flow through the channels in the bipolar plate 30 and exit the cell N, 20, through the anode outlet 39 to the anode exit manifold. This direction is schematically represented by the flow arrow between conductive spacer 28 and bipolar plate 30. The water and unreacted feed gas will then flow through the anode outlet manifold and out the stack exit 14. Because cell N, 20, is not an active cell, the entrained water in the anode feed stream 48 does not degrade performance of any cell in the stack 10

Cell N-1, 22, is set up in the same manner as cell N, 20. Specifically, the cathode and coolant ports are blocked by blocking the cathode inlet 42 and coolant inlet 44. It is appreciated that the cathode inlet and coolant inlet are located adjacent to the anode inlet of the bipolar plate 30. Cell N-1, 22, contains a conductive spacer 32 of the type set forth above in connection with cell N, 20. Preferably, the cathode outlet 43 is blocked, and coolant outlet 45 remains open. The conductive spacer 32 is non-reactive.

As in cell N, 20, cell N-1, 22, has the anode inlet 46 open. The anode inlet 46 is located on the anode side of bipolar plate 50 adjacent the conductive spacer 32. Also, anode outlet 47 is open. Thus, the anode port of the cell N-1, 22 is open.

Operation of cell N-1, 22, is the same as that with respect to cell N, 20, as set forth above. Specifically, the anode inlet or feed stream 48 enters the anode inlet 46. The anode feed stream 48 flows through the channels formed in the bipolar plate 50 to the anode exit manifold. Any entrained water in the anode fed stream 48 passes through the channels in the bipolar plate 50 through the anode outlet 47 and is collected in the anode exit manifold and discharged through the stack outlet 14. As shown in FIG. 1, cell N-2, 24, is the first active cell. Cell N-2, 24, starts at the cathode side of the bipolar plate 50. Adjacent the bipolar plate 50 are the MEA and gas diffusion media 52 as is well known. The anode side of bipolar pate 68 provides the end of cell N-2, 24. In cell N-2, 24, all of the cathode, coolant and anode ports are open. Thus, the cathode inlet 54 and coolant inlet 56 are open in bipolar plate 50. Similarly, the anode inlet 58 in bipolar plate 68 is open. Also, the cathode outlet 55, coolant outlet 53 and anode outlet 57 are open. Thus, in cell N-2, 24, the coolant feed stream 60 enters the coolant inlet 58, the cathode inlet or feed stream 62 enters the cathode inlet 54 and the anode inlet stream 61 enters the anode inlet 58. Cell N-2, 24, operates to generate electricity in the well-known manner. Similarly, any cell in the stack that is to the right of cell N-2, 24, as viewed in FIG. 1, would operate to generate electricity in the conventional manner. As shown in FIG. 1, these cells are not shown, but are represented by the three dots 66. These dots indicate that any number of operative or active cells may be used.

While the various inlets and outlets are shown to be open or blocked in cells N, 20, and N-1, 22, it will be appreciated that it is preferred that the outlets for each of the anode 39, 47, 59 and coolant 37, 45, 53 remain open. One reason for leaving the anode outlets 39, 47, 59 open in cells N, 20, and N-1, 22, is that water exiting the fuel cell stack 10 may become backed up. That is, excess water in the fuel cell stack 10 may not be discharged from the fuel cell stack 10 at a satisfactory rate. By leaving the anode outlets open, excess water exiting the stack may back up into the anode path on the bipolar plate 30 and bipolar plate 50. Again, because cells N, 20, and N-1, 22, are inactive, the presence of the excess water in these cells does not degrade any active cell performance. Again, it is preferred that the cathode outlets 35, 43 of cells N, 20 and N-1, 22, remain closed to prevent the back feeding of cathode stream gasses and the mixing of gasses in these bypass cells.

In the embodiment shown above, the configuration is designed to reduce the negative effect of anode inlet flooding. The unipolar plate 26 would normally have the cathode inlet 34 and coolant inlet 36 open to allow air and coolant to flow into the flow fields. In the FIG. 1 embodiment, both the cathode inlet 34 and coolant inlet 36 are blocked because cell N, 20, is an inactive cell designed with only the anode flow field 38 open. Similarly, for cell N-1, 20, cathode 42 and coolant 44 inlets are blocked in the bipolar plate 30. Anode inlet 46 remains open. Cell N-2, 24, the first active cell, has cathode 54, coolant 56 and anode 58 inlets open. In cells N, 20, and N-1, 22, there is no MEA, and the gas diffusion media is used as a conductive spacer. Water entering the inlet 12 of the stack 10 with the anode reactant stream, or water vapor condensing on the cool manifold of the anode inlet, can flow through the anode flow field of the inactive cells N, 20 and N-1, 22. Depending on the size of the stack 10, i.e., the number of cells in the stack 10, the amount of incoming anode gas may need to be increased to compensate for the loss of fuels through the inactive cells or bypass. Further, the velocity of the anode gas may need to be increased. However, as the volume or velocity of the anode gas increases, additional inactive or bypass cells may be required.

It will be appreciated that the inactive cells can range from a minimum of 1 to any number of cells necessary to remove sufficient water to reduce the negative effect of water on the first active cell. The quantity of inactive cells is dependent upon the amount of water that may drop out in the inlet velocity of the fuel. As the inlet velocity of the fuel stream increases, any entrained water is spread out over more cells. Thus, it may require more inactive cells to reduce the negative effect of water in the inlet streams.

Figure 2:
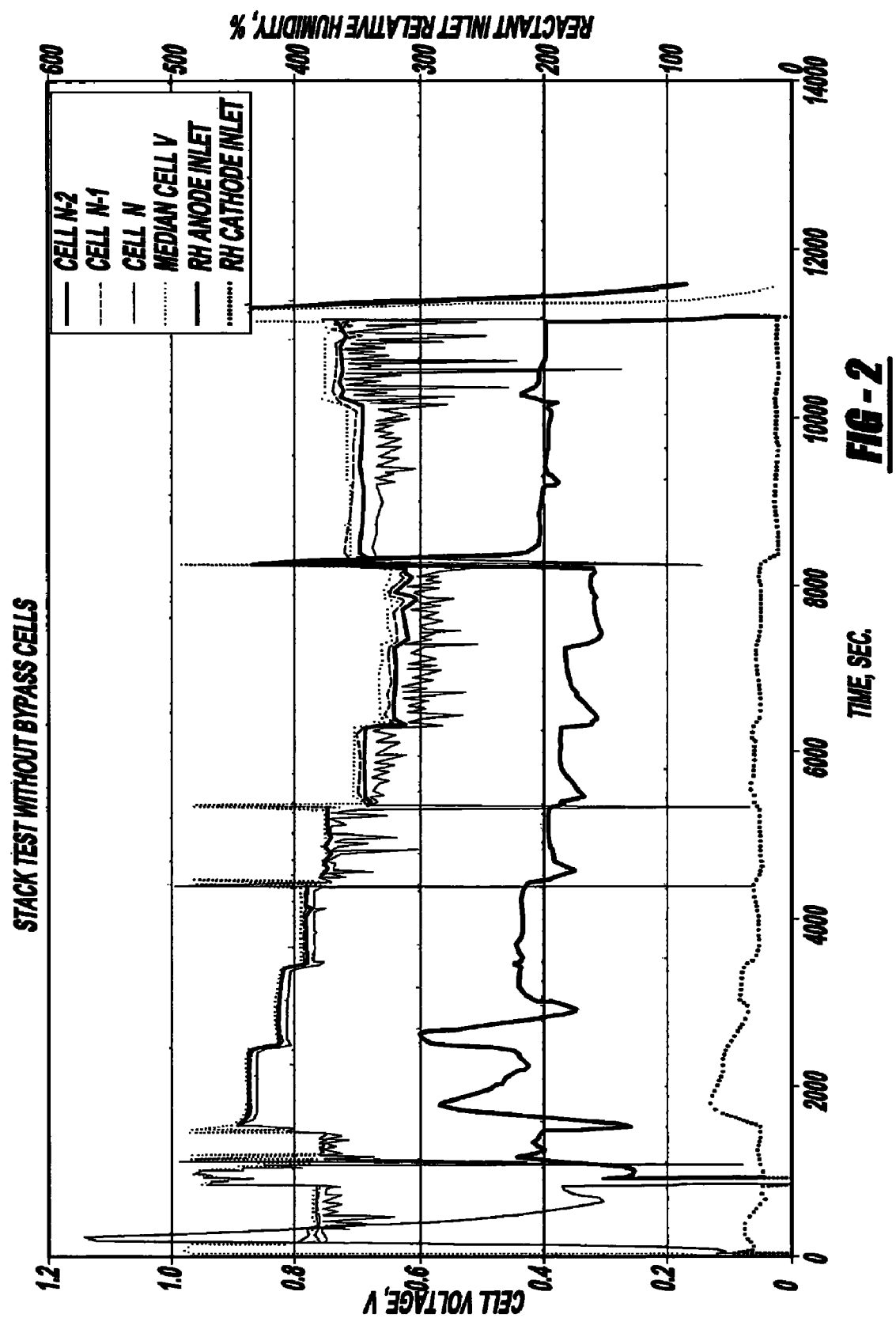
FIG. 2 is a graph showing test results of a fuel cell stack.

FIG. 2 is a graph representing certain test results. Specifically, a cell stack was configured in the conventional manner. That is, all cells in the stack were active. The same nomenclature as described above was used. Namely, cell N is closest to the wet end of the stack. In the case of the graph of FIG. 2, the cell stack used did not include any bypass. Thus, all cells, cells 1 though N, were operative. The relative humidity of the cathode and anode inlet streams was calculated over time and recorded. Similarly, the voltage of cells N, N-1, and N-2 were measured and plotted against time. Also plotted on FIG. 2 is the median cell voltage. The stack for which the results are shown in FIG. 2 contained 199 cells. The graph of FIG. 2 shows that in an ordinary stack without having the cathode and coolant inlets blocked and using all active cells, a degradation occurs in the cells nearest the wet end. More specifically, and as can be seen in FIG. 2, the cell closest to the wet end, cell N, exhibited degraded and inconsistent cell voltage. Cell N-1, exhibited better performance, but still exhibited some cell degradation due to excessive water. Cell performance stabilized in cells further removed from the wet end.

Figure 3:
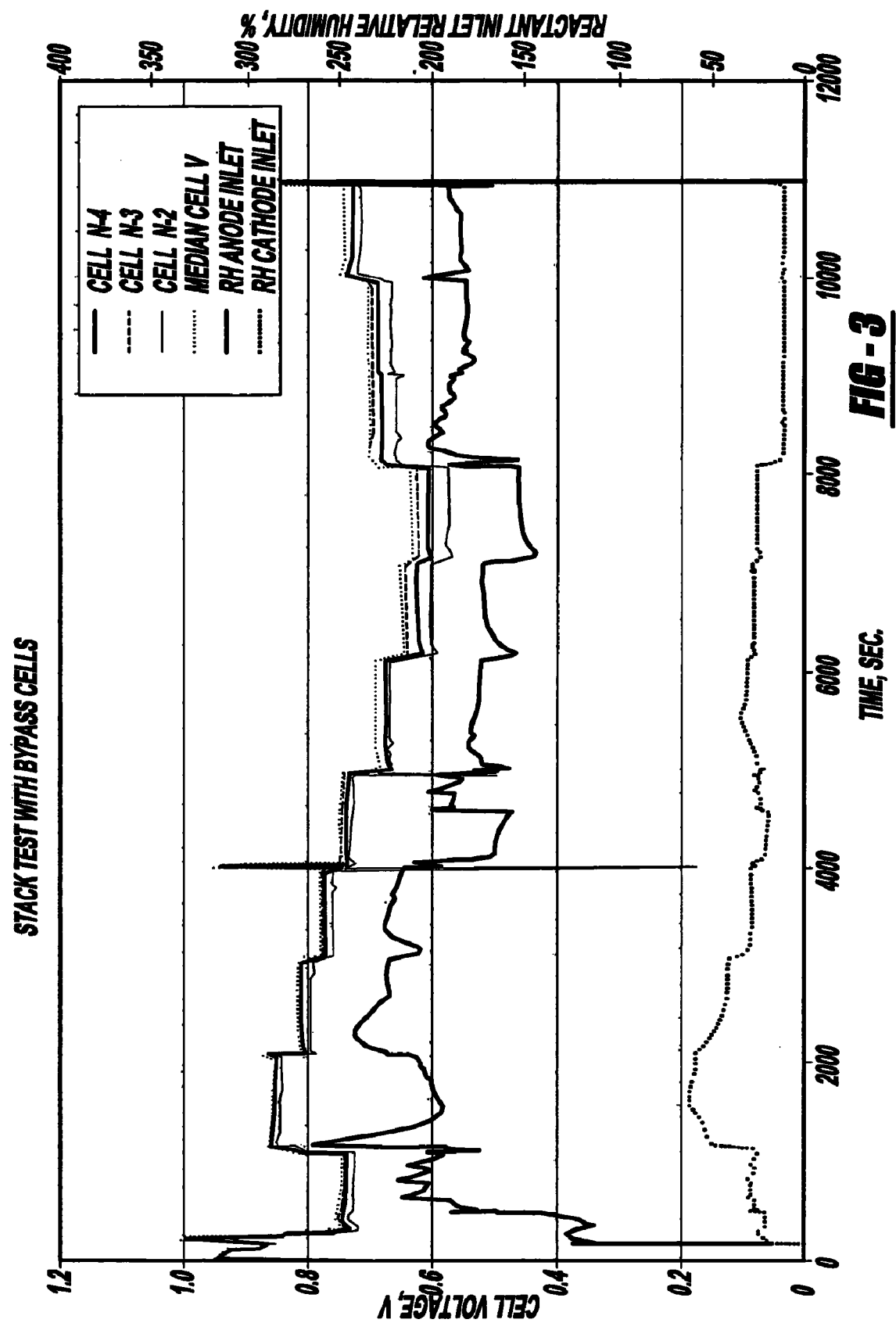
FIG. 3 is a graph showing test results of a fuel cell stack with bypass.

FIG. 3 shows test results for a fuel cell stack including the inactive cells adjacent the wet end of the fuel cell stack according to the preferred embodiment of the present invention. Specifically, a fuel cell stack 10 was constructed as shown in FIG. 1. The stack comprised a total of 201 cells, two of which were inactive. Since cells N and N-1 were inactive, they do not generate electricity and, therefore, are not shown in the graph. The first three electricity generating cells, N-2, N-3 and N-4 are shown and plotted over time. The anode and cathode inlet relative humidity is also shown. As can be seen, the first active cell near the stack inlet, cell N-2, 22, showed significantly less degradation in cell performance due to water than the first active cell, cell N, 20, in the conventional stack. Thus, the performance of the first cell that is operative to generate electricity is greatly improved. This can be attributed to the removal of at least some of the excess water from the anode feed stream in the inactive cells.

Figure 4:
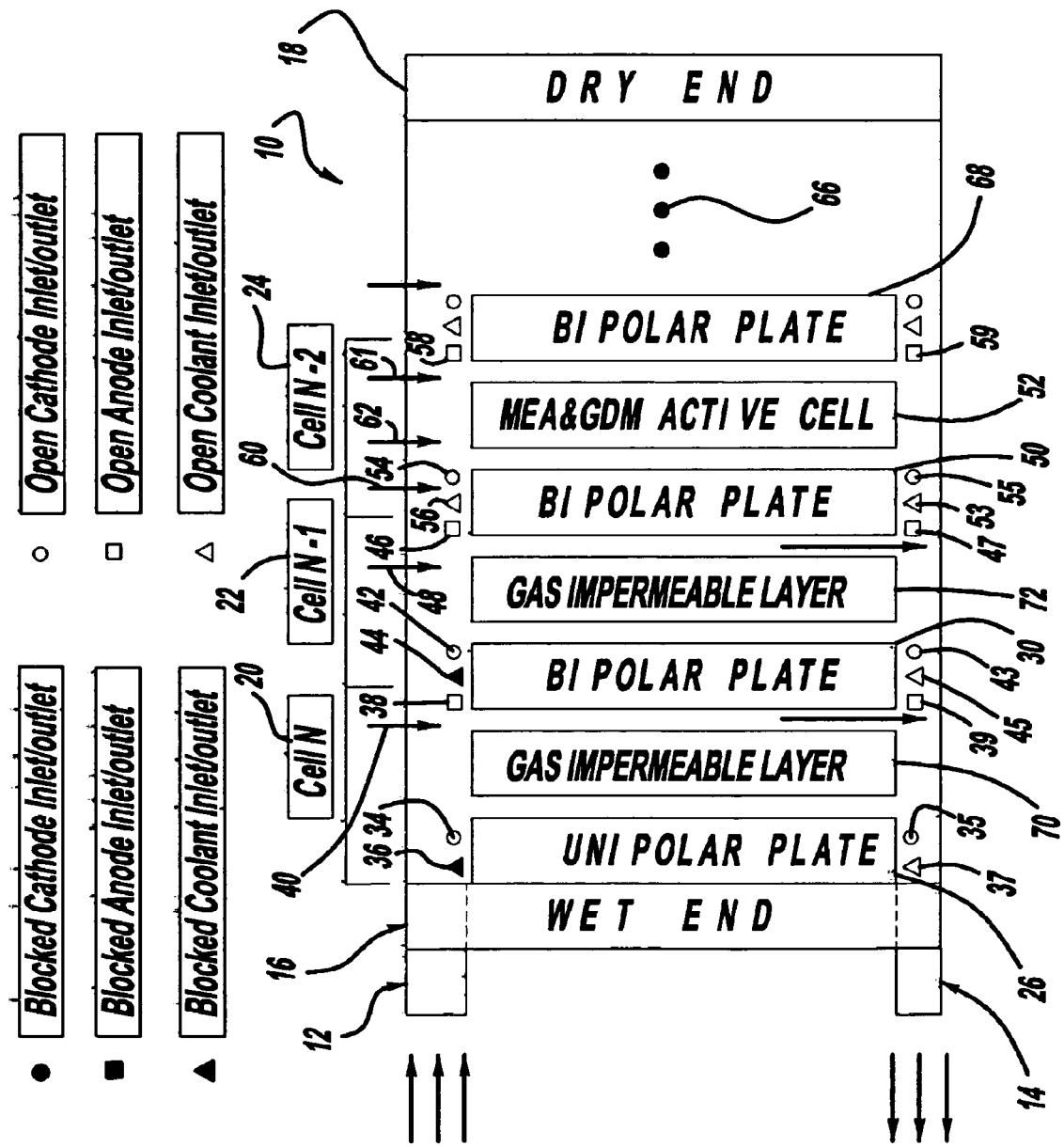
FIG. 4 is a schematic view of a fuel cell stack in accordance with another embodiment of the present invention.

Another embodiment of the present invention is shown in FIG. 4. The stack 10 of FIG. 4 is constructed in the same manner as the stack 10 of FIG. 1 except as specified below. In cells N and N-1, in addition to providing an anode bypass, a cathode bypass is provided. As shown, the cathode ports and specifically the cathode inlets 34, 42 and cathode outlets 35, 43 are open to allow the cathode feed stream to flow over the respective plates 26, 30. This type of design would be useful in a fuel cell stack 10 that may be in peril of cathode inlet flooding in addition to anode inlet flooding. In this alternative design, the conductive spacer 28 of the FIG. 1 design is preferably replaced by a different element. Preferably the element is a gas impermeable layer 70, 72 that is electrically conductive. In the most preferred embodiment, the gas impermeable layer comprises metal. In this manner, cells N and N-1 remain inactive, but provide a bypass for both the cathode inlet stream and anode inlet stream. Such a spacer provides a current conductive reactant barrier which prevents cross flow of reactant.

It will be appreciated that in addition to a bypass of the type for the anode feed stream, FIG. 1, and the anode and cathode feed streams, FIG. 2, a cell could be constructed having only a cathode feed stream bypass. This type of design would be useful in a fuel cell stack that may be peril of cathode inlet flooding. In such a case, the cathode ports in cells N and N-1 would be open while the anode ports would be blocked. Preferably, the anode ports would be blocked by blocking both the anode inlets 38, 46 and anode outlets 39, 47.

In addition to providing a fuel cell stack, the present invention provides a method of reducing the amount of water entering electricity-generating cells of a fuel cell stack. As is fully set forth above, a plurality of cells for generating electricity are arranged in series, N-2, N-3, etc. Each of the cells comprises a pair of bipolar plates 50, 68. The bipolar plate 68 defines the anode side of the cell. The bipolar plate 50 defines the cathode side of the cell. A gas diffusion media and membrane electrode assembly 52 is disposed between the separator plates. An anode inlet 58 is provided on the bipolar plate 68 for directing an anode feed stream to the anode side of the cell. A cathode inlet 54 is provided on the bipolar plate 50 for directing a cathode feed stream 62 to the cathode side of the cell. The anode inlet 58 is in fluid communication with an anode inlet manifold. Similarly, the cathode inlet 54 is in fluid communication with a cathode inlet manifold. A bypass is provided adjacent the electricity generating cell at the wet end by providing at least one inoperative cell, N, 20, N-1, 22, adjacent the electricity generating cell, N-2, 24, at the wet end. The bypass can be constructed as set forth above. Accordingly, at least one of the cells, and preferably two cells, N, 20, and N-1, 22, are inoperative to generate electricity.

FIGS. 1 and 4 show an embodiment where the bypass is adjacent the wet end 16 and forms part of the cell stack, albeit inactive. It will be appreciated, however, that the bypass may be placed adjacent the wet end of the stack and outside of the cell stack 10 itself. More specifically, FIG. 5 shows a schematic view of a fuel cell stack assembly having a bypass in accordance with another embodiment of the present invention. In this embodiment, the fuel cell stack 10 is as set forth above except that each of the cathode ports are open and the coolant ports are open. Further, an MEA/GDM assembly 80, 82 is placed between each of the unipolar 26 and bipolar 30, 50 plates. In this manner, each cell in the stack including cell N, 20 and N-1, 22 are active cells that produce electricity, and the stack 10 comprises a cell constructed in a known manner. Bypass assembly 100 is placed adjacent the wet end 16 but external to the stack itself. The bypass assembly 100 has a fuel bypass inlet 102 and a fuel bypass outlet 104 to the stack. The fuel bypass inlet 102 receives one or more of the cathode, anode or coolant feed streams represented by the flow arrows in FIG. 5. The bypass assembly 100 removes excess water from at least one of the anode and cathode feed streams. The anode and/or cathode streams having the reduced water exit the assembly of the fuel bypass outlet 104 and enter the fuel cell stack at the stack inlet 12 as shown by the flow arrows of FIG. 5. Excess water removed from either the anode or cathode or both streams flows toward the bypass product outlet 106 as shown by the flow arrow 110 in FIG. 5.

The bypass assembly can take any suitable configuration that removes excess water from either or both of the anode stream and cathode stream. For instance, the bypass assembly may take the configuration of the inactive cells, cells N, 20 and N-1, 22 in the same manner as that set forth above in FIGS. 1 and 4. Alternatively, the bypass assembly 100 may comprise a water separator or drop out vessel. It is preferable that any water separator or drop out vessel, however, not comprise a condenser. It is desirable only to remove excess water from the anode feed stream yet maintain the requisite humidification for optimum cell operation to the anode and cathode feed streams that actually enters the fuel cell stack 10.

The bypass assembly may in some instances also include a product inlet 108. The product inlet 108 receives the output streams from the cell stack, as shown by the flow arrows in FIG. 5. These flow streams include an unreacted fuel stream, an unreacted air and water stream and a coolant stream. When appropriate, these streams are combined with the stream containing the removed excess water as set forth above and exit the bypass product outlet 106.I It will be appreciated that the bypass can take any suitable configuration to remove excess water from the anode and/or cathode feed streams. When such an external bypass assembly 100 is used, it is preferred that the operating conditions of the bypass assembly 100 be similar to those of the operational stack 10. More particularly, it would be beneficial if the temperature of the bypass assembly 100 were at or near the temperature of the operational stack 10 to prevent condensation of water in the feed stream that leaves the bypass assembly through the fuel bypass outlet 104. Thus, it is preferred that the system and operating conditions are designed to reduce introduction of liquid water into the stack inlet 12 in the feeds stream. The operating conditions are preferably such that condensation of water is reduced after the reactant feed streams enter the stack 10 through the stack inlet 12.

The invention has been described in an illustrative manner and it is understood that the description is intended to be in the nature of words of description rather than of limitation. Obviously, many modifications and variations are possible in light of the above teachings. It is, therefore, to be understood that the invention is set forth in the appended claims.

What is claimed is:

1. A fuel cell stack assembly comprising:
a plurality of cells comprising a stack for generating electricity arranged in series from a wet end to a dry end, each of said cells comprising at least two separator plates defining an anode side and a cathode side and including gas diffusion media and a membrane electrode assembly between said separator plates, each of said cells further comprising an anode inlet on one of said separator plates for directing an anode feed stream to said anode side of said cell and a cathode inlet on the other of said separator plates for directing a cathode feed stream to said cathode side of said cell, said anode inlet in fluid communication with an anode inlet manifold and said cathode inlet in fluid communication with a cathode inlet manifold; and
a bypass adjacent said wet end adapted to reduce the amount of water entering said electricity generating cells, wherein said bypass comprises at least one inoperative cell that does not generate power but conducts electricity.

2. A fuel cell stack assembly as set forth in claim 1 wherein said at least one inoperative cell comprises at least two separator plates defining an anode side and a cathode side and including an element between said separator plates, each of said at least one inoperative cell further comprising an anode inlet on one of said separator plates for directing an anode feed stream to said anode side of said inoperative cell and a cathode inlet on the other of said separator plates for directing a cathode feed stream to said cathode side of inoperative cell, said anode inlet in fluid communication with said anode inlet manifold and said cathode inlet in fluid communication with said cathode inlet manifold.

3. A fuel cell stack assembly as set forth in claim 2 wherein said element comprises a conductive gas impermeable spacer.

4. A fuel cell stack assembly as set forth in claim 3 wherein said fuel cell stack includes two inoperative cells.

5. A fuel cell stack assembly as set forth in claim 2 wherein at least one of said cathode inlet and said anode inlet of said at least one inoperative cell is blocked.

6. A fuel cell stack assembly as set forth in claim 5 wherein said element comprises gas diffusion media.

7. A fuel cell stack assembly as set forth in claim 5 wherein said cathode inlet of said at least one inoperative cell is blocked to prevent the flow of the cathode feed stream to the cathode side of said at least one inoperative cell.

8. A fuel cell stack assembly as set forth in claim 7 wherein said at least one inoperative cell includes a cathode outlet, said cathode outlet blocked to prevent the backflow of fluid into said at least one inoperative cell through said cathode outlet.

9. A fuel cell stack assembly as set forth in claim 5 wherein said anode inlet of said at least one inoperative cell is blocked to prevent the flow of the anode feed stream to the anode side of said at least one inoperative cell.

10. A fuel cell stack assembly as set forth in claim 6 wherein said fuel cell stack includes two inoperative cells.

11. A fuel cell stack assembly as set forth in claim 5 further comprising a coolant inlet manifold for directing the flow of a coolant feed stream, each of said electricity generating cells and said at least one inoperative cell including a coolant inlet in fluid communication with said coolant inlet manifold to direct the coolant stream over said separator plates.

12. A fuel cell stack assembly as set forth in claim 11 wherein said coolant inlet of said at least one inoperative cell is blocked to prevent the flow of the coolant stream in said separator plates.

13. A fuel cell stack assembly as set forth in claim 1 wherein said bypass is external to said stack.

14. A fuel cell stack assembly as set forth in claim 1 wherein said at least one inoperative cell comprises at least two separator plates defining an anode side and a cathode side and including an element between said separator plates, each of said at least one inoperative cell further comprising an anode inlet on one of said separator plates for directing an anode feed stream to said anode side of said inoperative cell and a cathode inlet on the other of said separator plates for directing a cathode feed stream to said cathode side of inoperative cell, said anode inlet in fluid communication with said anode inlet manifold and said cathode inlet in fluid communication with said cathode inlet manifold.

15. A fuel cell stack assembly as set forth in claim 1 wherein at least one of said cathode inlet and said anode inlet of said at least one inoperative cell is blocked.

16. A fuel cell stack assembly as set forth in claim 15 wherein said element comprises gas diffusion media.

17. A fuel cell stack assembly as set forth in claim 15 wherein said cathode inlet of said at least one inoperative cell is blocked to prevent the flow of the cathode feed stream to the cathode side of said at least one inoperative cell.

18. A fuel cell stack assembly as set forth in claim 17 wherein said at least one inoperative cell includes a cathode outlet, said cathode outlet blocked to prevent the backflow of fluid into said at least one inoperative cell through said cathode outlet.

19. A fuel cell stack assembly as set forth in claim 15 wherein said anode inlet of said at least one inoperative cell is blocked to prevent the flow of the anode feed stream to the anode side of said at least one inoperative cell.

20. A fuel cell stack assembly as set forth in claim 13 wherein said bypass comprises a water separator.

* * * * *